United States Patent
Bush et al.

(10) Patent No.: US 10,894,708 B2
(45) Date of Patent: Jan. 19, 2021

(54) DOOR AND BAFFLE INTERFACE ASSEMBLY FOR FROZEN DESSERT MACHINES

(71) Applicant: Taylor Commercial Foodservice, LLC, Rockton, IL (US)

(72) Inventors: Mark E. Bush, Rockton, IL (US); Nathan Matz, Beloit, WI (US)

(73) Assignee: TAYLOR COMMERCIAL FOODSERVICE, LLC, Rockton, IL (US)

( * ) Notice: Subject to any disclaimer, the term of this patent is extended or adjusted under 35 U.S.C. 154(b) by 0 days.

(21) Appl. No.: 16/394,276

(22) Filed: Apr. 25, 2019

(65) Prior Publication Data

US 2019/0337791 A1 Nov. 7, 2019

Related U.S. Application Data

(60) Provisional application No. 62/665,764, filed on May 2, 2018.

(51) Int. Cl.
*B67D 3/00* (2006.01)
*B23Q 1/70* (2006.01)
*B67D 99/00* (2010.01)

(52) U.S. Cl.
CPC .............. *B67D 3/008* (2013.01); *B23Q 1/70* (2013.01); *B67D 3/0012* (2013.01); *B67D 99/00* (2013.01)

(58) Field of Classification Search
CPC ...... B67D 3/008; B67D 3/0012; B67D 99/00; B23Q 1/70; A23G 9/281; A23G 9/12; A23G 9/22; A23G 9/08; A23G 9/277

(Continued)

(56) References Cited

U.S. PATENT DOCUMENTS 3,172,422 A * 3/1965 Koch ..................... A23G 9/281
                                                           137/375
4,698,984 A * 10/1987 Manfroni ............... A23G 9/224
                                                            62/343

(Continued)

FOREIGN PATENT DOCUMENTS

JP       2005-224126      8/2005
JP       2009-45031       3/2009

(Continued)

OTHER PUBLICATIONS

International Search Report for PCT/US19/29862, dated Jul. 10, 2019, 2 pp.

(Continued)

*Primary Examiner* — Lien M Ngo
(74) *Attorney, Agent, or Firm* — Barnes & Thornburg LLP

(57) ABSTRACT

An interface assembly for a frozen dessert machine is disclosed that includes a freezer door having opposed front and rear sides and including at least one recessed mounting pocket formed in the rear side thereof, the at least one recessed mounting pocket including a cornice covering an upper portion thereof, and at least one elongated baffle having opposed proximal and distal end portions, the proximal end portion of the at least one baffle including a retention flange that is dimensioned and configured for detachable reception within the at least one mounting pocket of the freezer door behind the cornice.

15 Claims, 9 Drawing Sheets

(58) Field of Classification Search
USPC ........ 222/279, 282, 240–242, 146.6; 62/342, 62/343; 366/305, 310, 312, 313, 279, 366/282, 314, 608
See application file for complete search history.

(56) References Cited

U.S. PATENT DOCUMENTS

| | | | |
|---|---|---|---|
| 5,906,105 A * | 5/1999 | Ugolini | A23G 9/045 366/274 |
| 6,299,025 B1 | 10/2001 | Watanabe et al. | |
| 6,490,872 B1 | 12/2002 | Beck et al. | |
| 6,494,055 B1 | 12/2002 | Meserole et al. | |
| 6,553,779 B1 | 4/2003 | Boyer et al. | |
| 6,735,967 B1 | 5/2004 | Bischel et al. | |
| 6,892,899 B2 | 5/2005 | Minard et al. | |
| 6,948,327 B2 | 9/2005 | Bischel et al. | |
| 6,986,441 B2 | 1/2006 | Scordato et al. | |
| 7,014,076 B2 | 3/2006 | Minard et al. | |
| 7,048,523 B2 | 5/2006 | Bush et al. | |
| 7,278,276 B2 * | 10/2007 | Boyer | A23G 9/045 366/309 |
| 7,299,944 B2 | 11/2007 | Roady et al. | |
| 8,016,168 B2 * | 9/2011 | Goulet | A23G 9/28 222/146.6 |
| 8,714,410 B2 | 5/2014 | Wadle et al. | |
| 9,301,537 B2 * | 4/2016 | Cocchi | A23G 9/224 |
| 9,398,774 B2 * | 7/2016 | Grampassi | A23G 9/045 |
| 9,487,383 B2 | 11/2016 | Minard et al. | |
| 9,661,867 B2 | 5/2017 | Minard et al. | |
| 9,765,891 B2 | 9/2017 | Bischel | |
| 9,848,620 B2 | 12/2017 | Minard et al. | |
| 9,903,495 B2 | 2/2018 | Matz et al. | |
| 9,943,088 B2 | 4/2018 | Newton et al. | |
| 10,194,678 B2 | 2/2019 | Bischel | |
| 2008/0302818 A1 | 12/2008 | Minard et al. | |
| 2011/0006079 A1 * | 1/2011 | McKay | A23G 9/282 222/144.5 |
| 2012/0104046 A1 | 5/2012 | Wadle et al. | |
| 2013/0068331 A1 * | 3/2013 | Matz | F16K 11/07 137/625.48 |
| 2014/0367424 A1 | 12/2014 | Newton | |
| 2016/0249637 A1 | 9/2016 | He et al. | |
| 2017/0027185 A1 | 2/2017 | Acosta et al. | |
| 2017/0042180 A1 | 2/2017 | Bush | |
| 2017/0049127 A1 | 2/2017 | Weldy | |
| 2017/0367370 A1 * | 12/2017 | Frisque | A23G 9/12 |
| 2018/0098554 A1 | 4/2018 | Cocchi et al. | |
| 2018/0206520 A1 | 7/2018 | Newton et al. | |
| 2019/0000109 A1 | 1/2019 | Bischel | |
| 2019/0056182 A1 | 2/2019 | Bischel et al. | |
| 2019/0110498 A1 | 4/2019 | Minard | |
| 2019/0337791 A1 | 11/2019 | Bush et al. | |

FOREIGN PATENT DOCUMENTS

| | | |
|---|---|---|
| WO | 2000/070963 | 11/2000 |
| WO | 2017/171622 A1 | 10/2017 |
| WO | 2017/176580 A1 | 10/2017 |
| WO | 2017/176609 A1 | 10/2017 |
| WO | 2017/210151 A1 | 12/2017 |
| WO | 2017/214357 A2 | 12/2017 |
| WO | 2018/009640 A1 | 1/2018 |
| WO | 2018.071334 A1 | 4/2018 |
| WO | 2018/140716 A1 | 8/2018 |

OTHER PUBLICATIONS

Written Opinion for PCT/US19/29862, dated Jul. 10, 2019, 3 pp.
Taylor Model C709 & C717 Heat Treatment Soft Serve Freezers Operator's Manual, Feb. 4, 2005 (Original Publication) (Updated Aug. 3, 2015), 62 pp.
Taylor Model 750, 751, 754, 774, 791, & 794 Soft Serve Freezers Operator's Manual, Feb. 1, 2001 (Original Publication) Updated Aug. 3, 2015, 46 pp.
Taylor X51532-12 Door w/Baffle, Product Info, https://www.webstaurantstore.com/taylor-x51532-12-door-w-baffle/HPX51532-12.html?ut . . ., dated Mar. 19, 2018, 3 pp.
Taylor X51531-9 Door, Product Info, https://www.webstaurantstore.com/taylor-x51531-9-door/HPX515319.html?utm_source=. . ., dated Mar. 19, 2018, 3 pp.
Taylor Models 702,741 & 772 Soft Serve Freezers Operator's Manual, Jun. 1997 (Original Publication) (Updated Jul. 1, 2015), 36 pp.
Examination Report issued in Appl. No. AU2019213346 (dated Sep. 6, 2020).

* cited by examiner

DOOR AND BAFFLE INTERFACE ASSEMBLY FOR FROZEN DESSERT MACHINES

CROSS-REFERENCE TO RELATED APPLICATIONS

This application claims priority from U.S. Provisional Application No. 62/665,764, filed on May 2, 2018, the entirety of which is hereby fully incorporated by reference herein.

BACKGROUND OF THE INVENTION

1. Field of the Invention

The subject invention is directed to frozen dessert machines, and more particularly, to a mechanical interface between a detachable cantilevered baffle and a freezer door of a frozen desert machine.

2. Description of Related Art

Machines for continuously freezing soft serve desserts are well known in the art. Most of these machines operate on a similar principle. A mixture of milk, sugar, gelatin, flavoring, coloring, nuts, fruits, syrups and sometimes eggs is fed into a metal cylinder or mixing chamber around which a compressed gas is expanded, making the metal surfaces of the mixing chamber very cold. Ice crystals form on the surface of the chamber and they are scraped off by sharp blades revolving around the interior of the chamber. Part of the scraping assembly is a beating arrangement that introduces air into the mixture, increasing its volume. The scraping assembly also moves the frozen dessert to the discharge spout associated with the door of the mixing chamber.

In frozen dessert machines sold by Taylor Company, a division of Carrier Commercial Refrigeration, Inc. located in Rockton, Ill., the scraping assembly is operatively associated with a cantilevered baffle that extends into the mixing chamber from the door of the freezer. In prior art soft serve dessert machines of this type, the cantilevered baffle is usually made from stainless steel and it has a threaded protrusion at its end that is used to affix the baffle to the interior surface of the freezer door, which is made from a plastic material unlike the baffle.

This metal-to-plastic threaded interface exhibits high field failure rates when subjected to a typical daily heat treatment cycle, during which the dessert product remaining within the mixing chamber is pasteurized at a temperature of between 150° F. to 160° F., and then cooled. This daily heat treatment cycle places stress on the threaded interface between the door and baffle, which tends to degrade the plastic door over time.

It would be beneficial therefore, to provide an interface between the door and baffle that could withstand the mechanical stress associated with a daily heat treatment cycle, and thereby effectively reduce or otherwise eliminate the high field failure rates that are currently being experienced in the marketplace. The subject invention provides such a solution.

SUMMARY OF THE DISCLOSURE

The subject invention is directed to a new and useful frozen dessert machine, and more particularly, to a novel mechanical interface assembly between a cantilevered baffle and the door of the frozen dessert machine to which it is affixed, which effectively reduces or otherwise eliminates the high field failure rates currently being experienced in frozen dessert machine in the marketplace.

The mechanical interface assembly of the subject invention includes a freezer door having opposed front and rear sides. At least one recessed mounting pocket is formed in the rear side of the freezer door, and the at least one mounting pocket has a cornice covering an upper portion thereof.

The interface assembly further includes at least one elongated baffle having opposed proximal and distal end portions. The proximal end portion of the at least one baffle includes a retention flange that is dimensioned and configured for detachable reception within the at least one mounting pocket of the freezer door behind the cornice covering the upper portion thereof.

The at least one mounting pocket in the rear side of the freezer door has a generally U-shaped configuration. The cornice that covers the upper portion of the at least one mounting pocket is preferably attached to the rear side of the freezer door by threaded fasteners, and a lower edge of the cornice is beveled. Alternatively, the cornice may be formed integral with the rear side of the freezer door.

The at least one baffle is preferably formed from a molded plastic material, which is similar to the material from which the freezer door is formed. Preferably, the at least one baffle is formed from a self-lubricating thermoplastic material, such as Delrin or a similar material.

The retention flange of the at least one baffle has a generally U-shaped configuration that corresponds to the configuration of the at least one mounting pocket in the freezer door. Preferably, an upper edge of the retention flange of the at least one baffle is beveled to cooperate with the beveled lower edge the cornice covering the upper portion of the at least one mounting pocket in the freezer door.

The at least one baffle has a central portion with a cross-sectional configuration that is adapted to enhance the blending of the dessert product by an associated rotatable beater. In one embodiment of the invention, the central portion has a generally cruciform cross-sectional configuration. In another embodiment of the invention, the central portion has a trilobular cross-sectional configuration. A generally cylindrical hub region is integrally formed on the proximal end portion of the at least one baffle for rotatably supporting the beater. An annular thrust bearing is also integrally formed on the proximal end portion of the at least one baffle between the cylindrical hub region and the retention flange for interacting with the beater. In addition, a generally cylindrical support region is integrally formed on the distal end portion of the at least one baffle for maintaining the concentricity of the baffle relative to the beater within a freezing cylinder.

In an embodiment of the invention, the freezer door includes a pair of recessed mounting pockets formed in the rear side thereof, and each mounting pocket has a cornice covering an upper portion thereof, and an elongated baffle is detachably associated with each recessed mounting pocket formed in the rear side of the freezer door.

These and other features of the subject invention will become more readily apparent to those having ordinary skill in the art to which the subject invention appertains from the detailed description of the preferred embodiments taken in conjunction with the following brief description of the drawings.

BRIEF DESCRIPTION OF THE DRAWINGS

So that those skilled in the art will readily understand how to make and use the subject invention without undue experimentation, preferred embodiments thereof will be described in detail herein below with reference to the figures wherein.

DETAILED DESCRIPTION OF THE PREFERRED EMBODIMENTS

Figure 1:
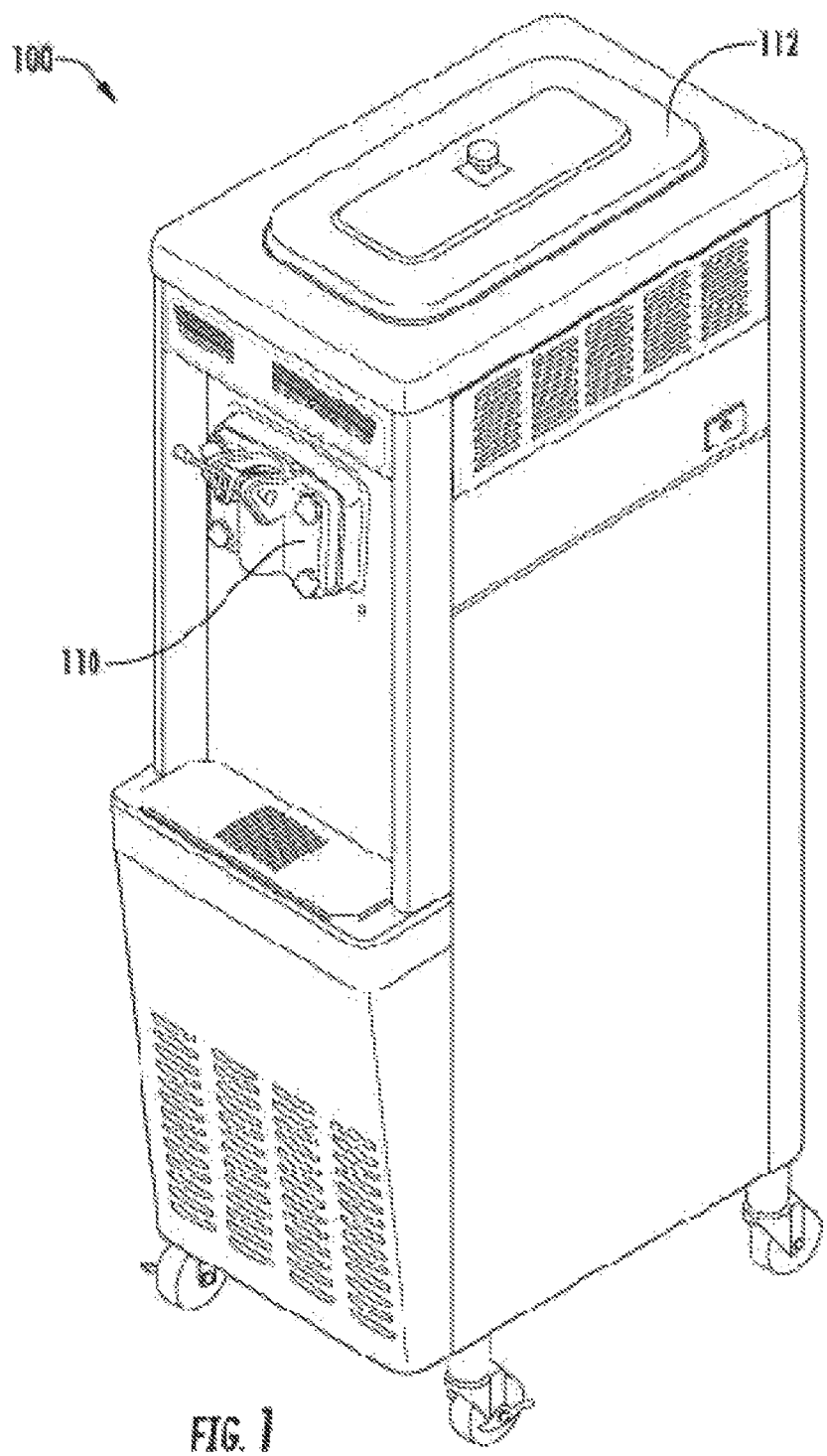
FIG. 1 is a perspective view of a frozen dessert machine that includes one mixing chamber and a single spout freezer door.
Figure 2:
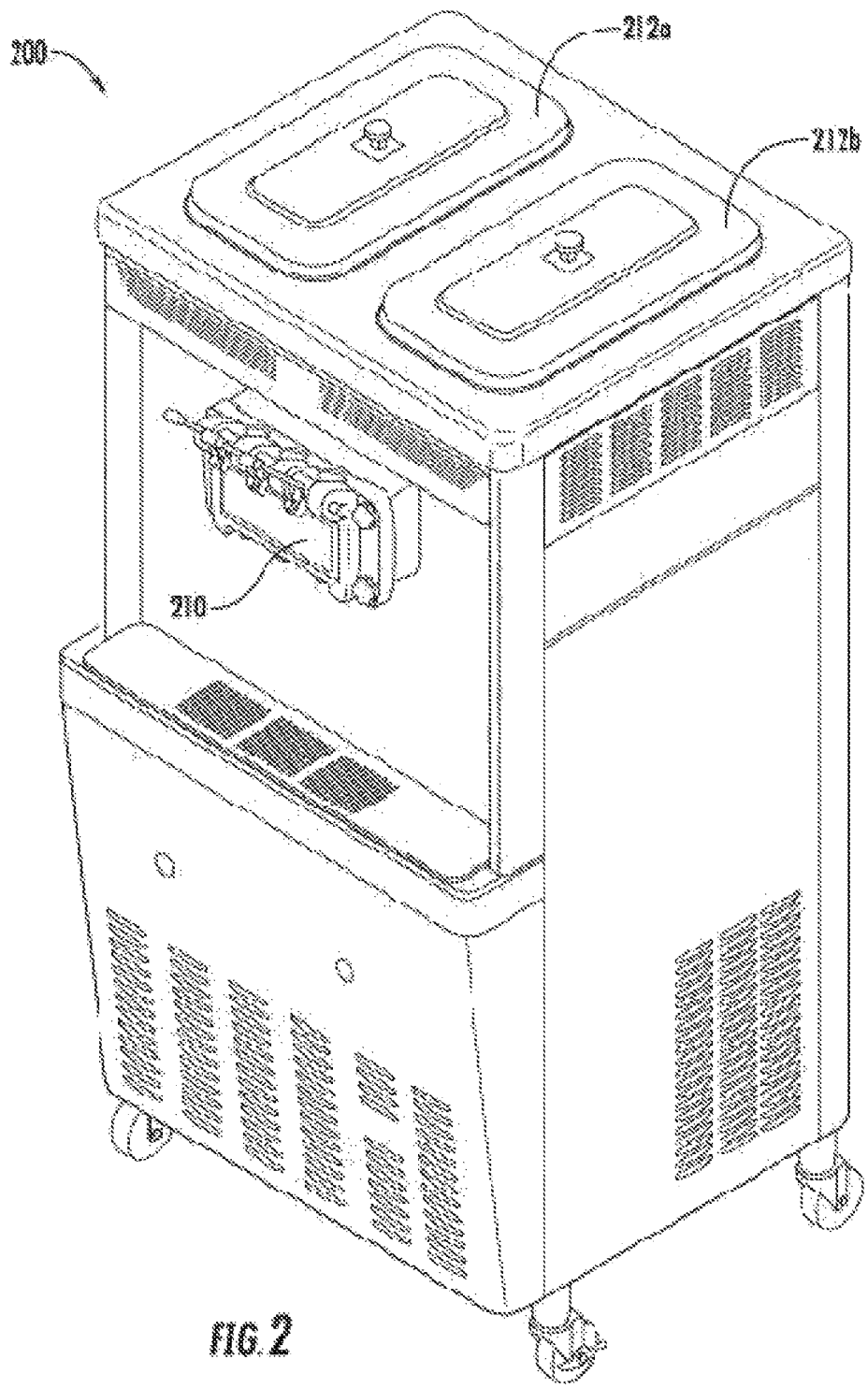
FIG. 2 is a perspective view of a frozen dessert machine that includes two mixing chambers and a three spout freezer door.

Referring now to the drawings wherein like reference numerals identify similar structural elements and features of the subject invention, there is illustrated in FIGS. 1 and 2, two different versions of soft serve dessert machines manufactured and sold by Taylor Company, a division of Carrier Commercial Refrigeration, Inc. located in Rockton, Ill. These are examples of the type of machines for which the door and baffle interface assembly of the subject invention was specifically designed.

More particularly, FIG. 1 shows a soft serve dessert machine designated generally by reference numeral 100 that includes a single spout freezer door 110 and a single mixing chamber 112 for blending a dessert product. Similarly, FIG. 2 shows a soft serve desert machine designated generally by reference numeral 200 that includes a three spout door freezer door 210 and two mixing chambers 212a and 212b for two different flavors of frozen dessert product. These two machines 100, 200 are merely exemplary of the dessert machines that are manufactured and sold by Taylor Company, and should not be viewed in anyway as limiting the scope of the subject disclosure.

These soft serve dessert machines require scheduled cleaning and sanitizing, often governed by statute and local regulatory agencies. Indeed, many of the soft serve dessert machines manufactured and sold by Taylor Company, such as the machines 100 and 200 illustrated in FIGS. 1 and 2, provide a daily heat treatment cycle to safely maintain dairy products contained therein up to two weeks, before a complete disassembly of the machine is required.

During the heat treatment cycle, the dessert product remaining within the mixing chambers of the machines is pasteurized at a temperature of between 150° F. to 160° F., and then cooled. This treatment method increases efficiency, decreases labor time and costs and reduces product waste. However, as explained in more detail below, repeated daily heat treatment cycles can cause certain critical components in these machines to undergo a significant amount of stress and fatigue, which can result in mechanical failures, taking the machines out of service until they can be repaired.

Figure 3:
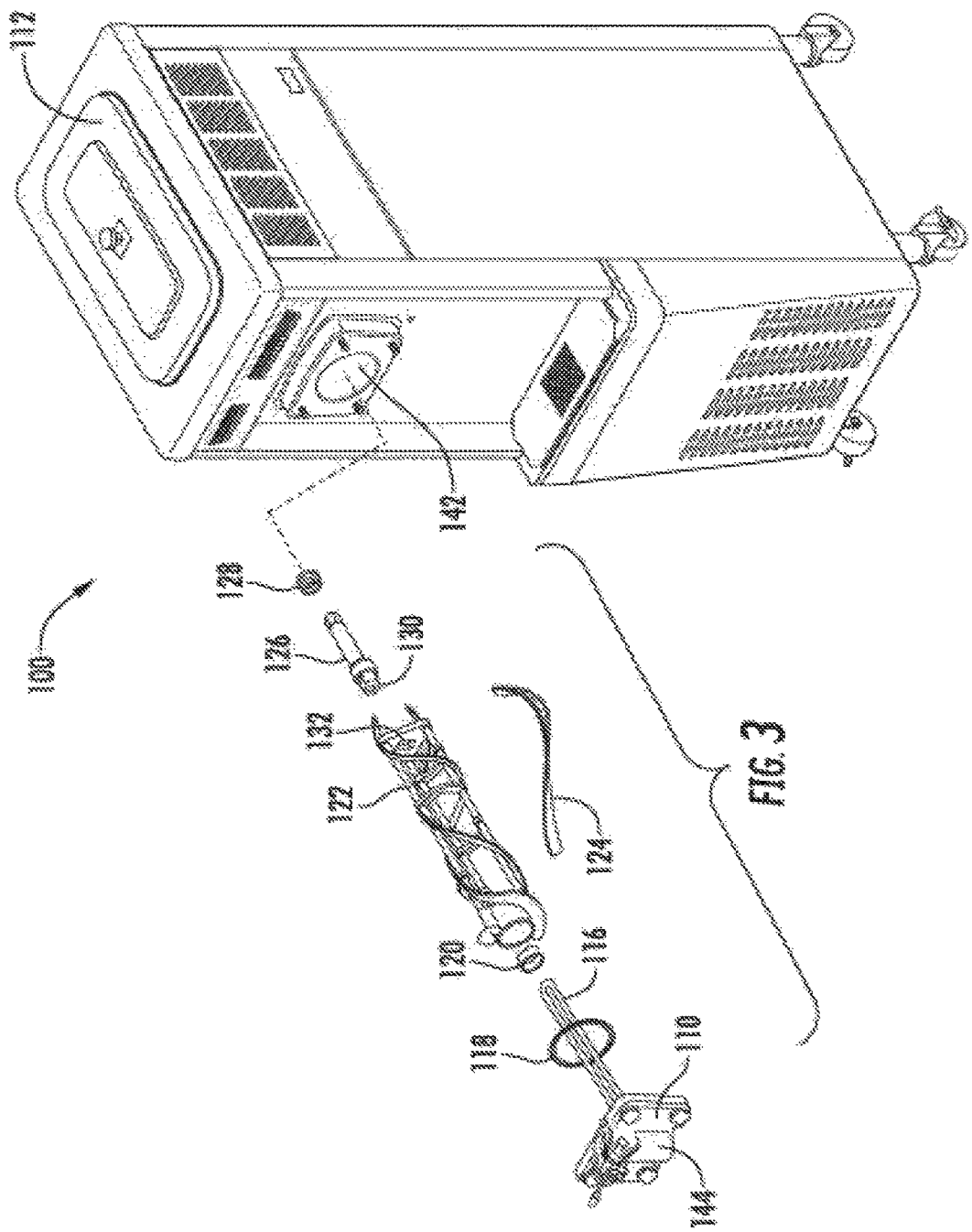
FIG. 3 is an exploded perspective view of the frozen dessert machine of FIG. 1, with certain parts separated for ease of illustration, including the freezer door and its associated baffle, as well as the beater assembly.

Referring now to FIG. 3, there is illustrated the soft serve dessert machine 100 with certain prior art component parts separated from the dessert machine for ease of illustration. More particularly, FIG. 3 illustrates the mechanical components that are associated with the single spout freezer door 110 of dessert machine 100. These components include an elongated cantilevered baffle 116 which is affixed to the rear surface of the freezer door 110, an annular door gasket 118 for sealing the freezer door relative to the freezing chamber 142, and a cylindrical bearing 120 which slides over the baffle 116 to rotatably support the front end portion of a helical beater 122. The helical beater 122 includes a plurality of scraper blades 124. The blades 124 are configured to scrape frozen dessert product from the interior surfaces of the freezing cylinder 142 and move that product toward the spout 144 on freezer door 110.

The mechanical components associated with freezer door 110 further include a beater drive shaft 126 and a drive shaft seal 128 that seals the end of the drive shaft 126 to the rear of the freezing cylinder or chamber 142. The beater drive shaft 126 has a rectangular head portion 130 that is dimensioned and configured to fit within a correspondingly shaped hole 132 on the rear end of the beater 122, to engage the two components together. In use, the beater drive shaft 126 transfers torque and rotational motion to the beater 120 from a motor housed within the dessert machine 100.

Figure 5:
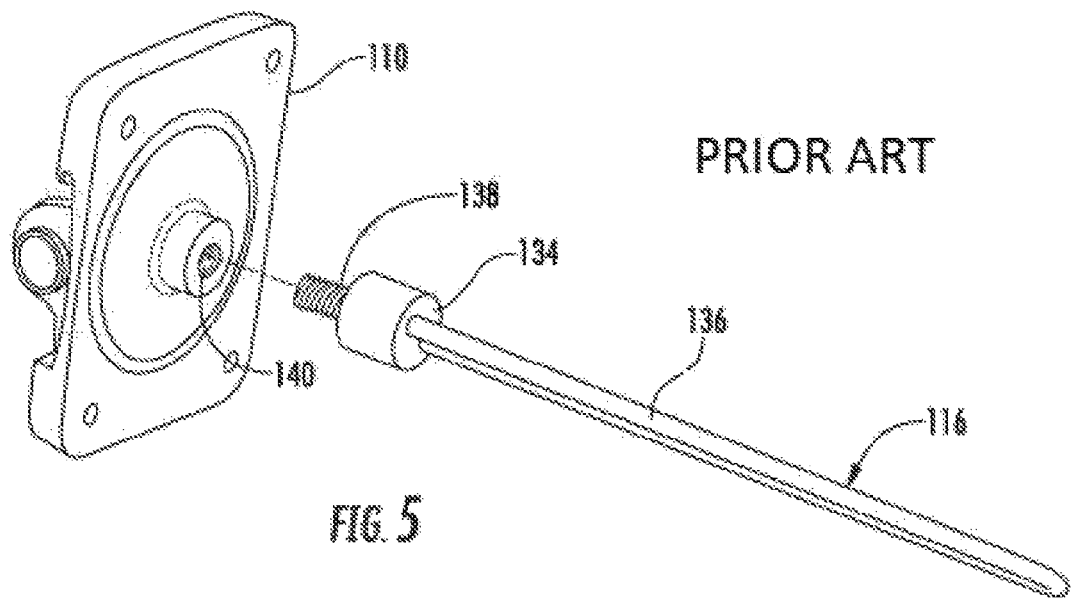
FIG. 5 is a perspective view of the freezer door of the frozen dessert machine of FIG. 1, with the baffle separated therefrom to illustrate the threaded interface that exists between these two components.

Referring now to FIG. 5, the prior art cantilevered baffle 116 includes a cylindrical hub portion 134 and an elongated U-shaped rod portion 136. A threaded protrusion or post 138 extends from the front end of hub portion 134 for threaded engagement with a corresponding threaded bore 140 formed in the rear surface of freezer door 110. The baffle 116 is made from stainless steel, while the freezer door 110 to which it is affixed, is made from plastic. This metal-to-plastic threaded interface between the plastic door 110 and the metal baffle 116 exhibits high field failure rates when subjected to a daily heat treatment cycle described above. The subject invention was developed to overcome this problem, as explained in more detail below.

Referring back to FIG. 3 in conjunction with FIG. 5, the cylindrical bearing 120 is dimensioned and configured to fit over the hub portion 134 of the baffle 116, and it includes a front flange 146 that acts as a thrust bearing between the freezer door 110 and the front end of the helical beater 122, which will tend to exert a force against the freezer door 110 when the dessert machine 100 is in operation.

Figure 4:
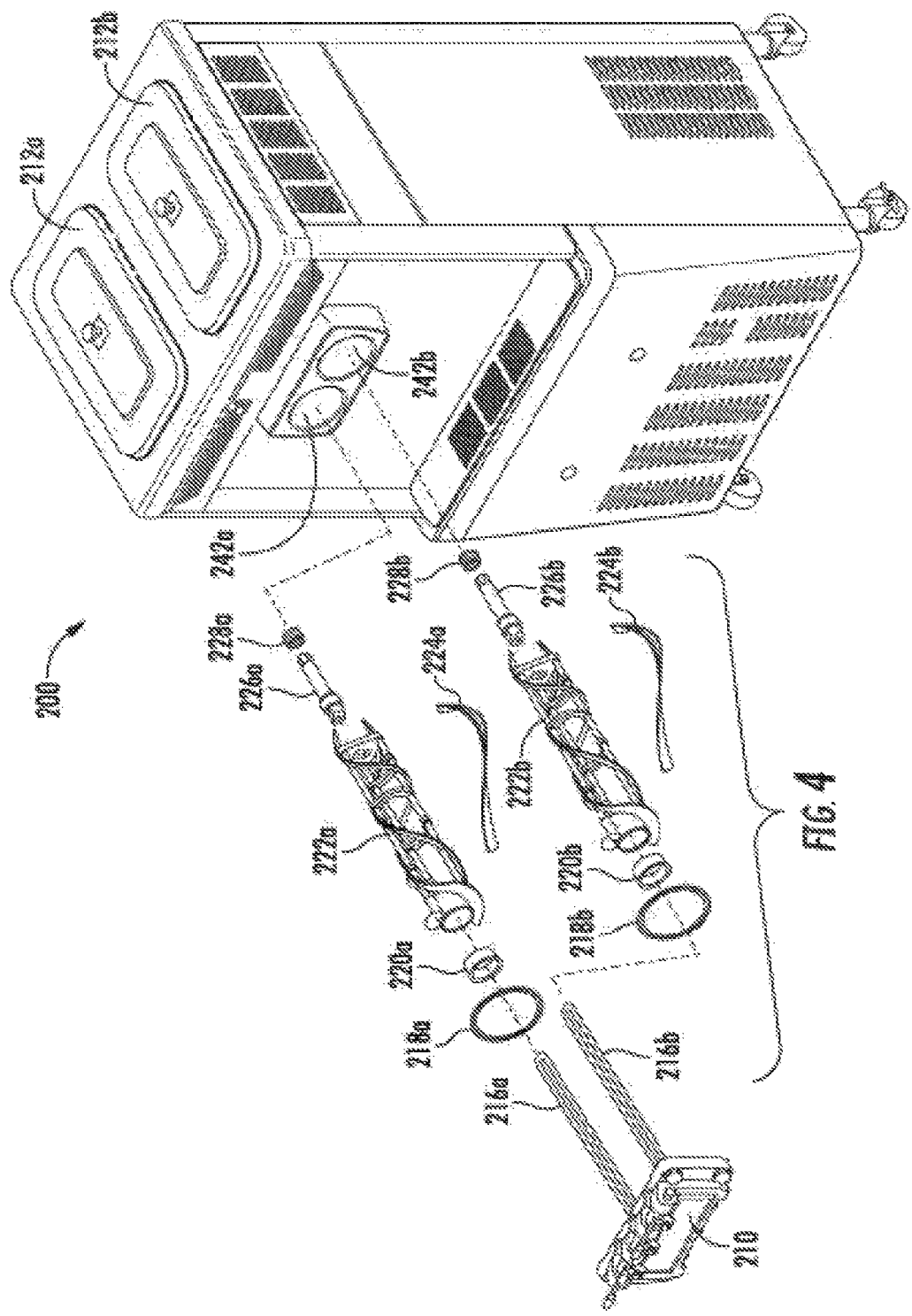
FIG. 4 is an exploded perspective view of the frozen dessert machine of FIG. 2, with certain parts separated for ease of illustration, including the freezer door and its associated baffles, as well as the beater assemblies.

Referring now to FIG. 4, there is illustrated the soft serve desert machine 200 with certain prior art component parts thereof separated for ease of illustration. More particularly, FIG. 4 illustrates two sets of common mechanical components that are associated with the three spout freezer door 210 of dessert machine 200. For the sake of brevity, these components include cantilevered baffles 216a, 216b affixed to three spout freezer door 210, annular door gaskets 218a, 218b for sealing the freezer door 210 with respect to the mixing chambers 242a, 242b, cylindrical bearings 220a, 220b (with front flanges 246a, 246b) for rotatably supporting and interacting with the helical beaters 222a, 222b (with scraper blades 224a, 224b), beater drive shafts 226a, 226b which engage and drive the beaters 226a, 226b, and associated drive shaft seals 228a, 228b that sealingly interact with the rear of the freezing cylinders 242a, 242b.

Figure 6:
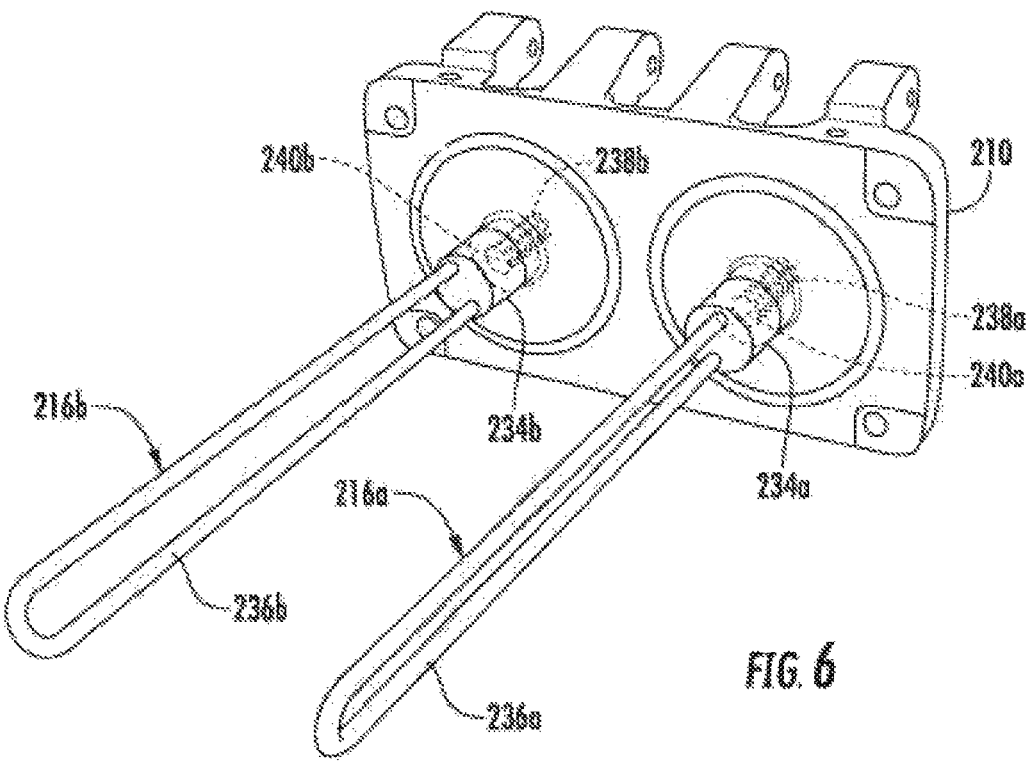
FIG. 6 is a perspective view of the freezer door of the frozen dessert machine of FIG. 2, with the two baffles threadably affixed to the door.

Referring to FIG. 6, each of the cantilevered baffles 216a, 216b of dessert machine 200 includes a cylindrical hub portion 234a, 234b and an elongated U-shaped rod portion 236a, 236b. A threaded protrusion or post 238a, 238b extends from each hub portion 234a, 234b for threaded engagement with corresponding threaded bores 240a, 240b formed in the rear surface of the freezer door 210. These baffles 216a, 216b are made from stainless steel, while the freezer door 210 to which they are threadably affixed is made from plastic. Once again, this metal-to-plastic threaded interface exhibits high field failure rates when subjected to a daily heat treatment cycle.

Figure 7:
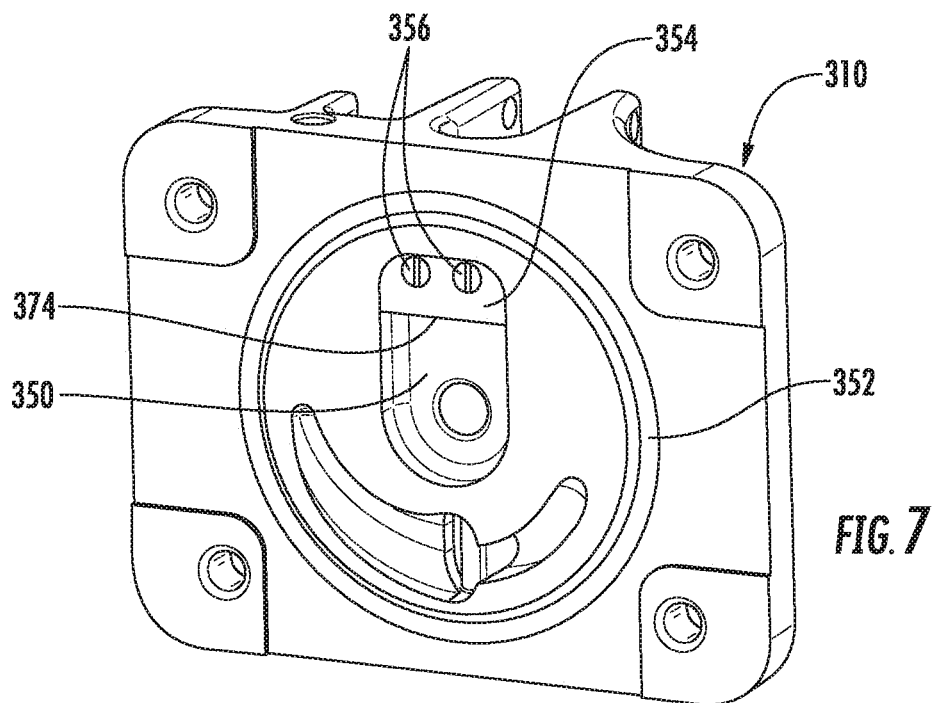
FIG. 7 is a perspective view of the freezer door of the frozen dessert machine shown in FIG. 1, illustrating the recessed mounting pocket formed therein and the cornice which covers an upper portion of the recessed mounting pocket.

Referring now to FIG. 7, there is illustrated a single spout freezer door constructed in accordance with a preferred embodiment of the subject invention and designated generally by reference numeral 310. Freezer door 310 is designed for use with dessert machine 100 shown in FIG. 1, and it is similar to the single spout freezer door 110 shown in FIG. 3, except that freezer door 310 has a generally U-shaped recessed mounting pocket 350 formed in the interior or rear surface thereof.

Figure 14:
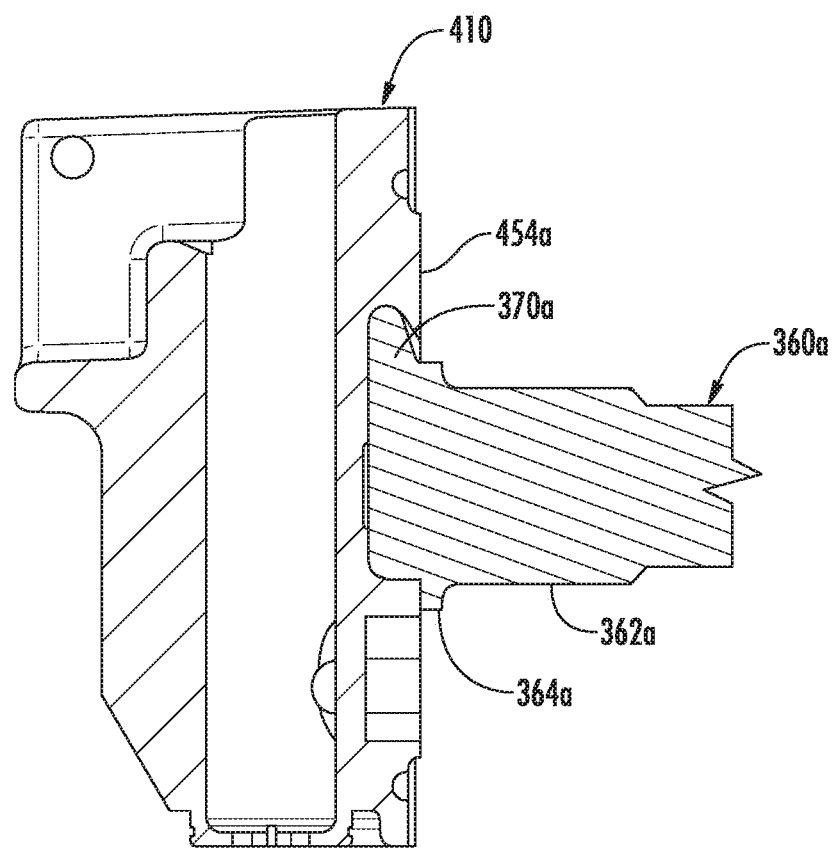
FIG. 14 is a cross-sectional view taken along line 14-14 of FIG. 10, illustrating the integrally formed cornice associated with the upper portion of the mounting pocket formed in the freezer door.

The recessed mounting pocket 350 is located within the periphery of annular groove 352 that accommodates the door gasket 118, which is shown in FIG. 3. A cornice 354 covers an upper portion of the mounting pocket 350. The cornice 354 is attached to the rear side of the freezer door 310 by a pair of threaded fasteners 356, as shown. Alternatively, the cornice may be formed integral with the rear side of the freezer door 310, as described in more detail below with reference to FIGS. 10 and 14.

Figure 8:
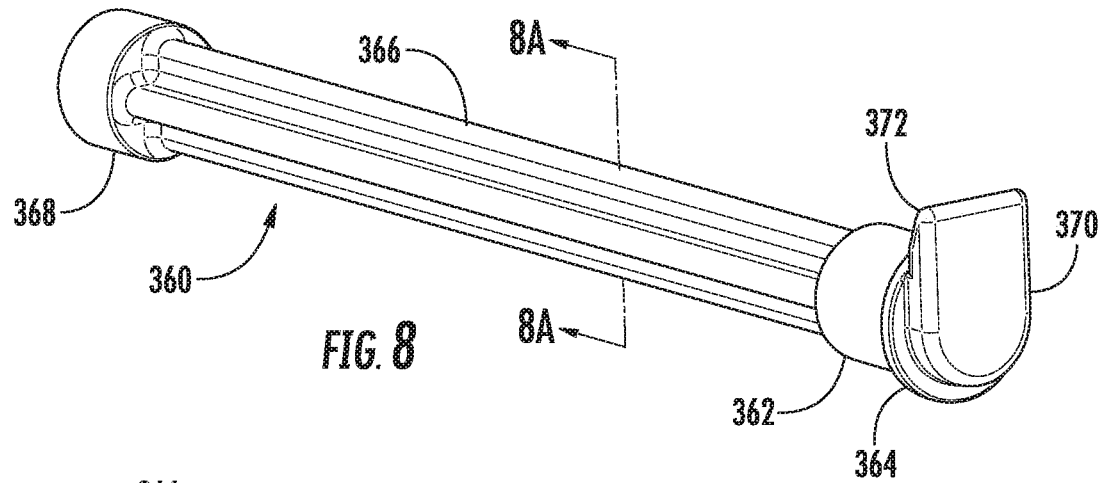
FIG. 8 is a perspective view of the cantilevered baffle of the subject invention, which includes a retention flange that is dimensioned and configured for reception within the mounting pocket of the freezer door shown in FIG. 7.

Referring to FIG. 8, there is illustrated a cantilevered baffle constructed in accordance with a preferred embodiment of the subject invention and designated generally by reference numeral 360. Unlike the prior art baffle 116 described above and shown in FIG. 5, baffle 360 is molded from a plastic material, not stainless steel. Preferably, the baffle 360 is formed from a self-lubricating thermoplastic material, such as, for example, Delrin, which exhibits high stiffness, low friction and dimensional stability when subjected to heat.

Figures 8A, 8B:
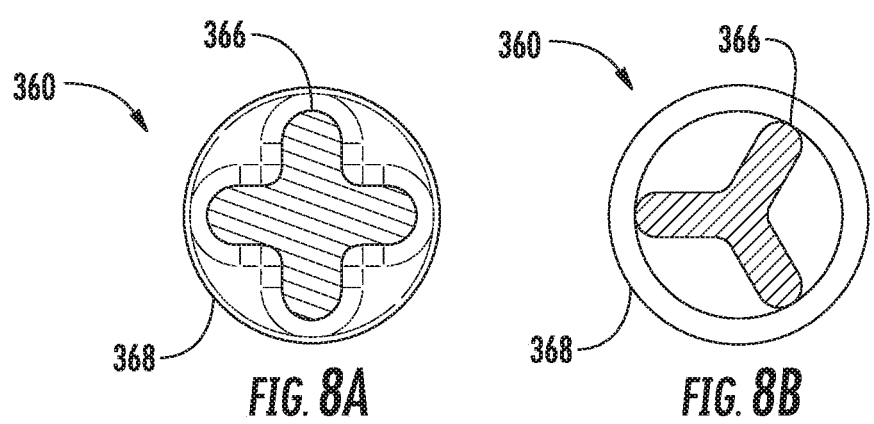
FIG. 8A is a cross-sectional view of the cantilevered baffle taken along line 8A-8A of FIG. 8, illustrating the generally cruciform cross-sectional configuration of the central portion of the baffle of the subject invention, which includes a retention flange that is dimensioned and configured for reception within the mounting pocket of the freezer door shown in FIG. 7.
FIG. 8B is a cross-sectional view of an alternative embodiment of the cantilevered baffle, illustrating the generally trilobular cross-sectional configuration of the central portion of the baffle.

The baffle 360 has a one-piece integral construction that includes a cylindrical front hub portion 362 having, an annular thrust bearing 364, an elongated central portion 366 and a generally cylindrical support region 368. The central portion 366 of the baffle 360 has a generally cruciform cross-sectional configuration, which is best seen in FIG. 8A. The cruciform shape aids in mixing dessert product within the core of the beater 122, and is an enhancement over the U-shaped portion 136 of prior art baffle 116. In an alternative embodiment of the baffle 360, the elongated central portion 366 has a generally trilobular cross-sectional configuration, as illustrated in FIG. 8B, which is also an enhancement over the prior art baffle 116.

The front hub portion 362 of baffle 360 supports rotation of the front end of the helical beater 122 and the integral thrust bearing 364 provides a bearing surface between the front end portion of the beater 122 and the freezer door 310. The cylindrical support region 368 of baffle 360 interacts with the beater drive shaft 126 to aid in keeping the baffle 360 concentric with the beater 122 and the freezing cylinder 142. By integrating these mechanical features into the one-piece baffle 360, there is a reduction in component parts relative to the prior art mechanical assembly shown in FIG. 3.

Figure 9:
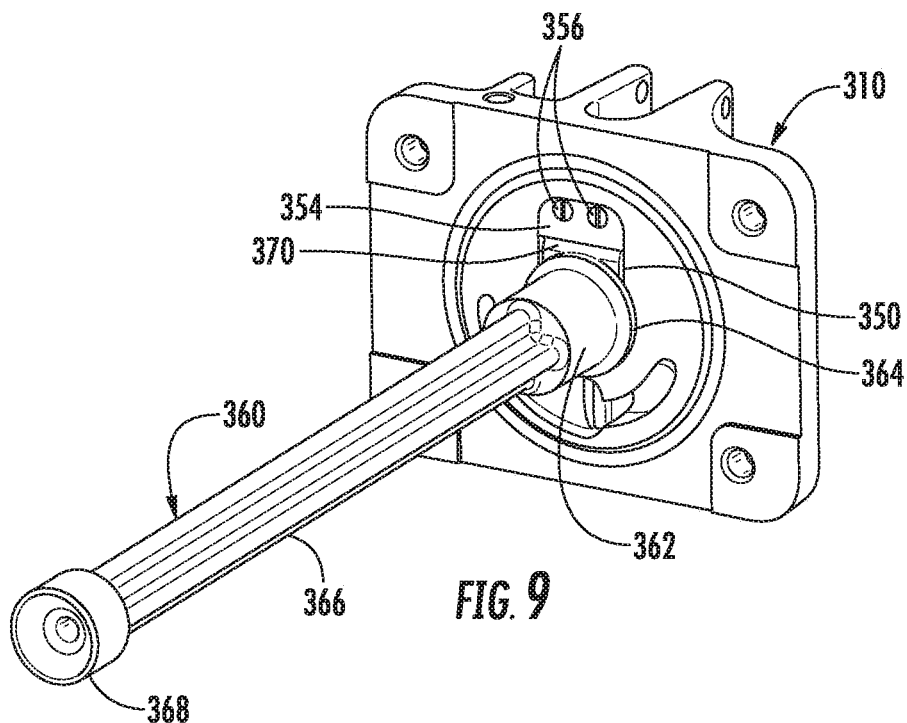
FIG. 9 is an assembled perspective view of the cantilevered baffle of FIG. 8 detachably retained in the recessed mounting pocket of the freezer door of FIG. 7, in accordance with the subject invention.

With continuing reference to FIG. 8, the front end of the baffle 360 is formed with a retention flange 370 that has a generally U-shaped configuration, which corresponds to the U-shaped configuration of the recessed mounting pocket 350 in the freezer door 310 shown in FIG. 7. More particularly, the retention flange 370 is dimensioned and configured for reception within the mounting pocket 350 of the freezer door 310 behind the cornice 354, as best seen in FIG. 9. It should be appreciated that an upper edge 372 of the retention flange 370 of baffle 360 is rounded or beveled, and a lower edge 374 of the cornice 354 covering the upper portion of mounting pocket 350 in freezer door 310 is angled or beveled (see FIG. 11). This eases the engagement of the retention flange 370 behind the cornice 354 of the mounting pocket 350, which will be described in more detail below with reference to FIGS. 11-13 below.

The U-shaped interface between the retention flange 370 of baffle 360 and the mounting pocket 350 of freezer door 310, prevents the baffle 360 from rotating relative to the freezer door 310 when the beater 122 is in motion during machine operation. Moreover, this plastic-to-plastic interface, which is shown in FIG. 9, is not susceptible to the stress and fatigue that has impacted the metal-to-plastic threaded interface of the prior art metal baffle 116 and plastic freezer door 110, as a result of repeated heat treatment cycles.

Figure 10:
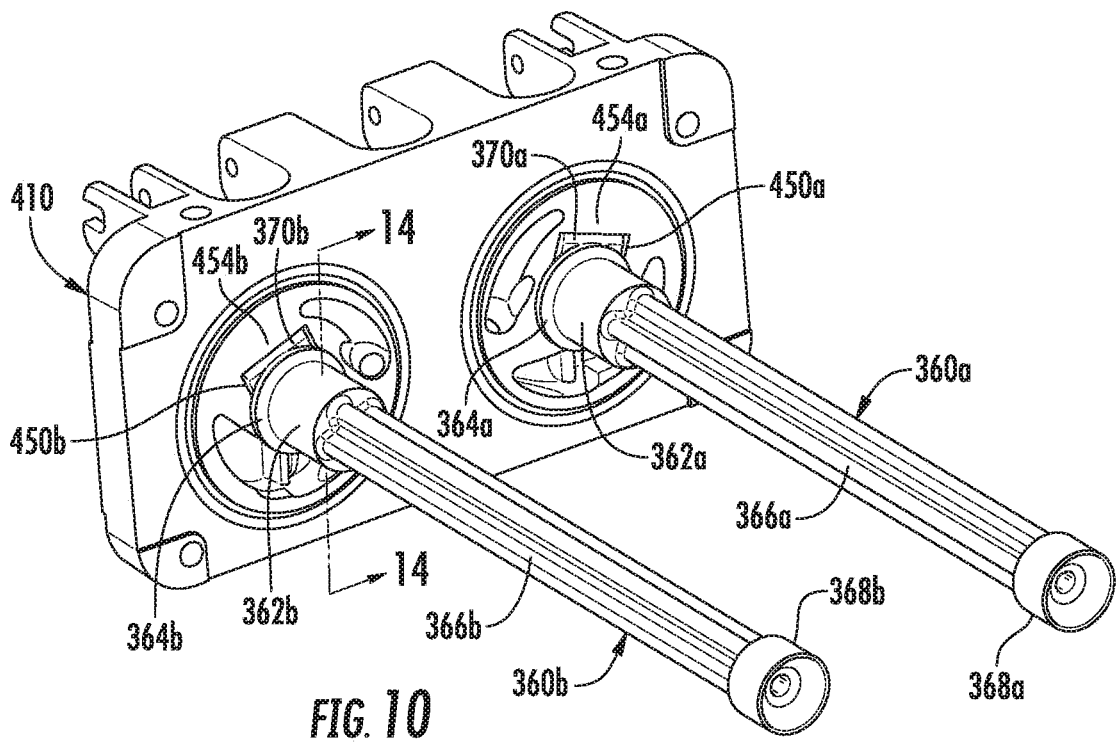
FIG. 10 is an assembled perspective view of two of the cantilevered baffles of FIG. 8 detachably retained in the recessed mounting pockets of a freezer door, in accordance with the subject invention, wherein the cornice associated with the upper portion of each mounting pocket is formed integral with the freezer door.

FIG. 10 illustrates the same mechanical interface described above as to FIG. 9, but for a three spout freezer door 410 designed for use with dessert machine 200 shown in FIG. 2, which supports two of cantilevered baffles 360a, 360b. Here, the freezer door 410 of the subject invention has two generally U-shaped mounting pockets 450a, 450b formed in the interior or rear surface thereof. The mounting pockets 450a, 450b corresponding to freezing cylinders 242a, 242 be of frozen dessert machine 200. As an alternative to the separate cornice 354 shown in FIG. 9, the embodiment of FIG. 10 provides integrally formed cornices 454a, 454b covering the upper portions of mounting pockets 450a, 450b.

Figure 11:
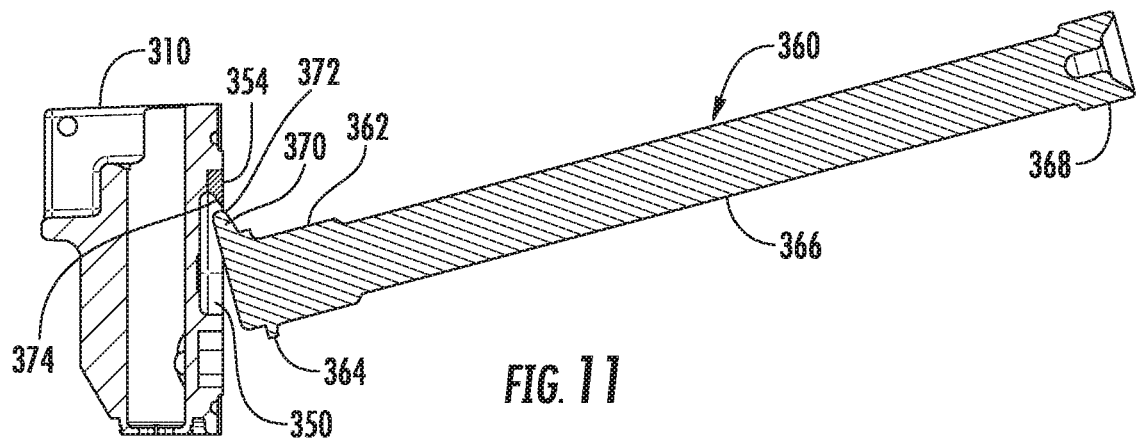
FIGS. 11 through 13 are a series of side elevational views, in cross-section, that illustrate the method of detachably securing the cantilevered baffle of FIG. 8 to the freezer door of FIG. 7, in accordance with a preferred embodiment of the subject invention.
Figure 12:
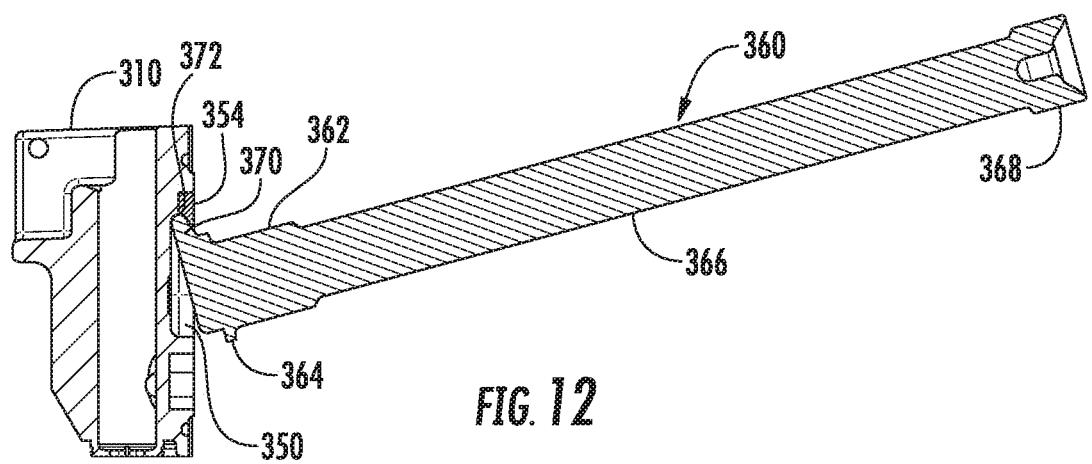
Figure 13:
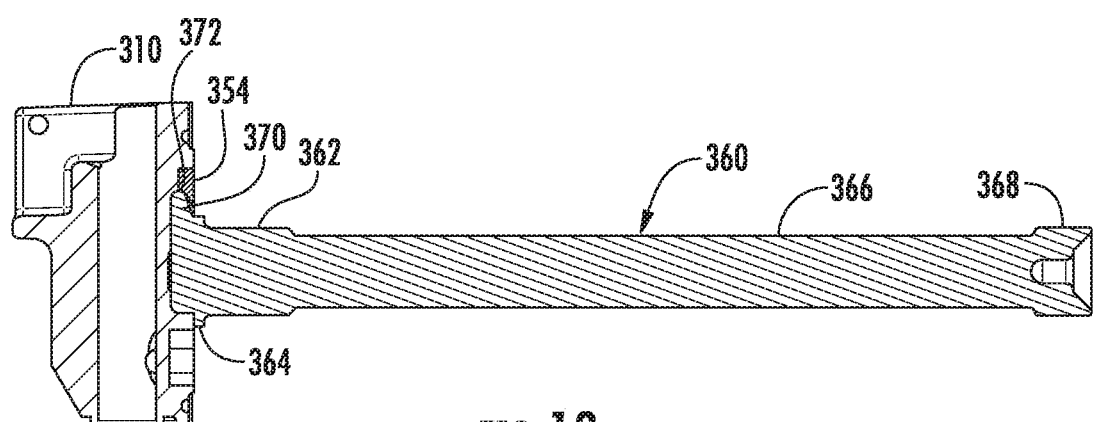

Referring now to FIGS. 11 through 13, there are illustrated a series of side elevational views, in cross-section, that illustrate the method of affixing the cantilevered baffle 360 to the freezer door 310 of frozen dessert machine 100, in accordance with a preferred embodiment of the subject invention. More particularly, FIG. 11 shows the initial positioning of the beveled upper edge 372 of the retention flange 370 of baffle 360 below the beveled lower edge 374 of the cornice 354 of mounting pocket 350 of the freezer door 310.

FIG. 12 shows the initial engagement of the retention flange 370 of baffle 360 behind the cornice 354 of mounting pocket 350, and FIG. 13 shows the angular pivoting of the baffle 360 into a final detachably engaged position of the retention flange 370 of baffle 360 within the mounting pocket 350 of freezer door 310, securely retained behind the cornice 354. This plastic-to-plastic mechanical interface assembly between the baffle 360 and the door 310 effectively reduces or otherwise eliminates the high field failure rates currently being experienced in the marketplace with respect to the prior art baffle 116 that is threadably affixed to the freezer door 110.

While the subject disclosure has been shown and described with reference to preferred embodiments, those skilled in the art will readily appreciate that changes and/or modifications may be made thereto without departing from the scope of the subject disclosure.

What is claimed is:

1. An interface for a frozen dessert machine comprising:
a) a freezer door having opposed front and rear sides and including at least one recessed mounting pocket formed in the rear side thereof, the at least one mounting pocket having a cornice covering an upper portion thereof; and
b) at least one elongated baffle having opposed proximal and distal end portions, the proximal end portion of the at least one baffle including a retention flange that is dimensioned and configured for detachable reception within the at least one mounting pocket of the freezer door behind the cornice covering the upper portion thereof.

2. The interface assembly as recited in claim 1, wherein the cornice is attached to the rear side of the freezer door by threaded fasteners.

3. The interface assembly as recited in claim 1, wherein the cornice is formed integral with the rear side of the freezer door.

4. The interface assembly as recited in claim 1, wherein the at least one baffle is formed from molded plastic material.

5. The interface assembly as recited in claim 1, wherein the at least one baffle is formed from a self-lubricating thermoplastic material.

6. The interface assembly as recited in claim 1, wherein a central portion of the at least one baffle has a generally cruciform cross-sectional configuration.

7. The interface assembly as recited in claim 1, wherein a central portion of the at least one baffle has a generally trilobular cross-sectional configuration.

8. The interface assembly as recited in claim 1, wherein the retention flange of the at least one baffle has a generally U-shaped configuration.

9. The interface assembly as recited in claim 8, wherein the at least one mounting pocket in the freezer door has a generally U-shaped configuration.

10. The interface assembly as recited in claim 1, wherein an upper edge of the retention flange of the at least one baffle is beveled.

11. The interface assembly as recited in claim 10, wherein a lower edge of the cornice covering upper portion of the at least mounting pocket is beveled.

12. The interface assembly recited in claim 1, wherein a generally cylindrical hub region is internally formed on the proximal end portion of the at least one baffle for rotatably supporting a beater.

13. The interface as recited in claim 12, wherein an annular thrust bearing is integrally formed on the proximal end portion of the at least one baffle between the cylindrical hub and the retention flange for interacting with the beater.

14. The interface assembly as recited in claim 12, wherein a generally cylindrical support region is integrally formed on the distal end portion of at least one baffle for maintaining the concentricity of the baffle relative to the beater.

15. The interface assembly as recited in claim 1, wherein the freezer door includes a pair of recessed mounting pockets formed in the rear side thereof, and wherein each mounting pocket has a cornice covering an upper portion thereof, and wherein an elongated baffle is detachably associated with each recessed mounting pocket formed in the rear side of the freezer door.

* * * * *